United States Patent [19]

Heimes

[11] Patent Number: 4,478,548
[45] Date of Patent: Oct. 23, 1984

[54] FORAGE ACCUMULATOR BOX

[76] Inventor: Daniel A. Heimes, R.R. 3, Box 63G, Hartington, Nebr. 68739

[21] Appl. No.: 293,318

[22] Filed: Aug. 17, 1981

[51] Int. Cl.³ .............................................. B60P 1/38
[52] U.S. Cl. .................................... 414/502; 198/497;
198/864; 414/523
[58] Field of Search ............... 414/502, 504, 505, 523,
414/528; 198/592, 497, 601, 611, 864, 865

[56] References Cited

U.S. PATENT DOCUMENTS

| 3,014,575 | 12/1961 | Klein | 198/668 X |
| 3,286,862 | 11/1966 | Hansen | 414/502 |
| 3,809,211 | 5/1974 | Padilla | 198/580 X |
| 3,912,094 | 10/1975 | Balzer | 414/528 |
| 4,256,431 | 3/1981 | Strauss et al. | 414/528 X |

Primary Examiner—Robert G. Sheridan
Attorney, Agent, or Firm—Zarley, McKee, Thomte, Voorhees & Sease

[57] ABSTRACT

A forage accumulator box has an upwardly and forwardly inclined bottom wall on which a main conveyor is situated for moving material upwardly and forwardly in the longitudinal direction of travel of the implement for discharge onto a cross conveyor which operates perpendicular to the direction of travel for moving the material outwardly to an elevated discharge chute which is hingedly supported for enabling passage between narrow passes such as bridges and the like.

6 Claims, 5 Drawing Figures

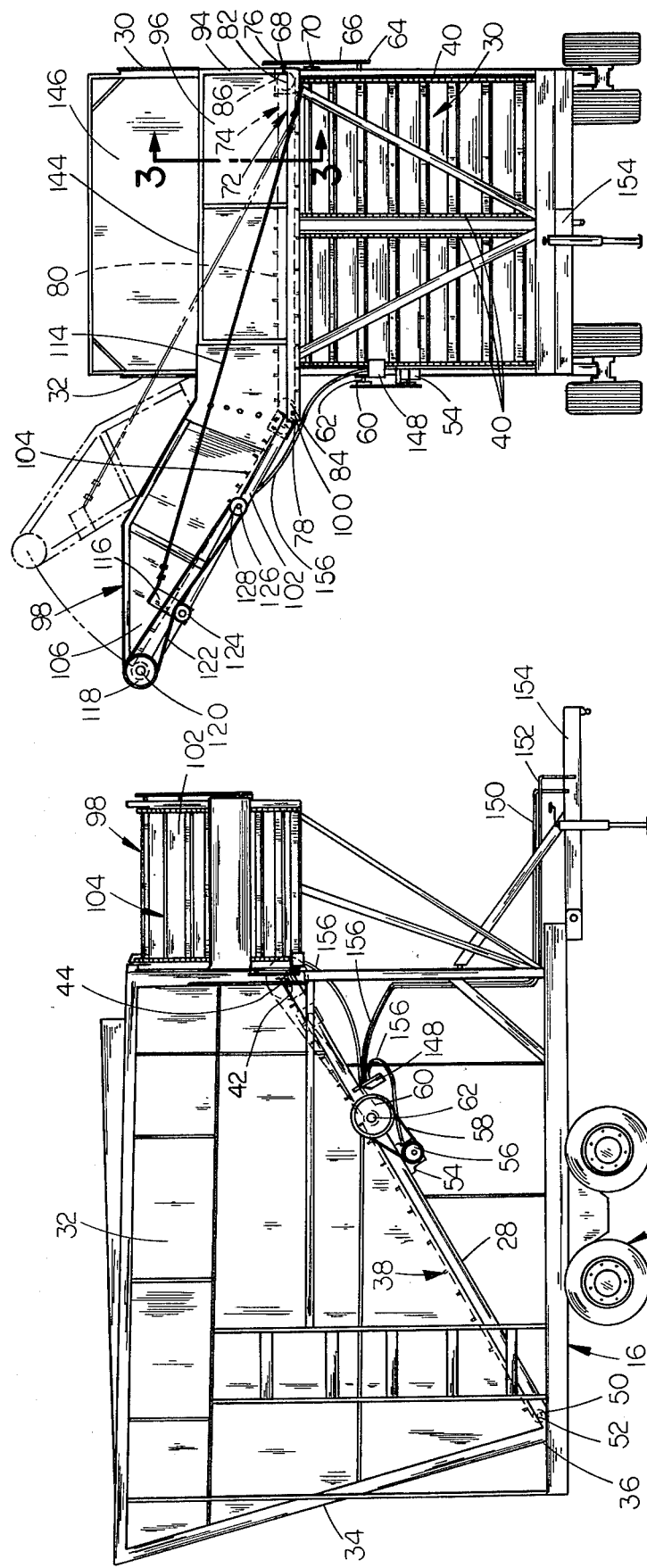

FORAGE ACCUMULATOR BOX

BACKGROUND OF THE INVENTION

The present invention is directed generally to an agricultural wheel mounted forage box which includes a longitudinally extended bottom wall for stable towing and an associated elevated cross conveyor for transverse discharge to a truck or the like.

Commercially available forage accumulator boxes, such as that manufactured by Balzer, are longitudinally shallow and transversely wide for accumulating forage on a continuous upwardly and outwardly inclined bottom wall. A single conveyor on the bottom wall is operative to discharge the material upwardly and outwardly to a waiting truck or the like.

Problems associated with this type of unit are that it is very wide and clumsy, that the elevated conveyor discharge hangs over oncoming traffic when towed on the road, that it is too wide for many bridges, and the weight is distributed on such a wide wheel base that it trails or tows poorly. Furthermore, when towed behind a self-propelled cutter, it doesn't fit between rows when a field is opened up. These problems are resolved by the forage accumulator box of the present invention.

Accordingly, a primary object of the invention is to provide an improved forage accumulator box.

Another object is to provide a forage accumulator box which is elongated in a fore and aft direction for handling and towing stability.

Another object is to provide a forage accumulator box having transverse shape and dimensions suited for towing on a road with oncoming traffic.

Another object is to provide a forage accumulator box having a transversely directed discharge chute which is movable transversely inwardly for reducing the effective width of the box.

Finally, another object is to provide a forage accumulator box which is simple and rugged in construction and efficient in operation.

SUMMARY OF THE INVENTION

The forage accumulator box of the present invention includes a longitudinally extended upwardly and forwardly inclined bottom wall supported on an elongated ground wheel supported frame. A rear wall and side walls extend upwardly from the bottom wall for accumulating forage supported thereon. A main conveyor is provided for advancing the forage material upwardly and forwardly on the bottom wall for discharge onto a generally horizontal platform at the upper end of the bottom wall. A cross conveyor on the platform conveys the forage material transversely to a discharge chute which is movable between a working position extended transversely outwardy from the platform and a working position having a reduced outward extent to enable towing of the accumulator box on the highway and through relatively narrow bridges. The longitudinal arrangement of the bottom wall features a substantially reduced wheel base and more leverage on the tongue for improved trailing and handling.

BRIEF DESCRIPTION OF THE DRAWINGS

FIG. 4 is a side view of the forage accumulator box; and

FIG. 5 is a front end view of the forage accumulator box.

DESCRIPTION OF THE PREFERRED EMBODIMENT

Figure 2:
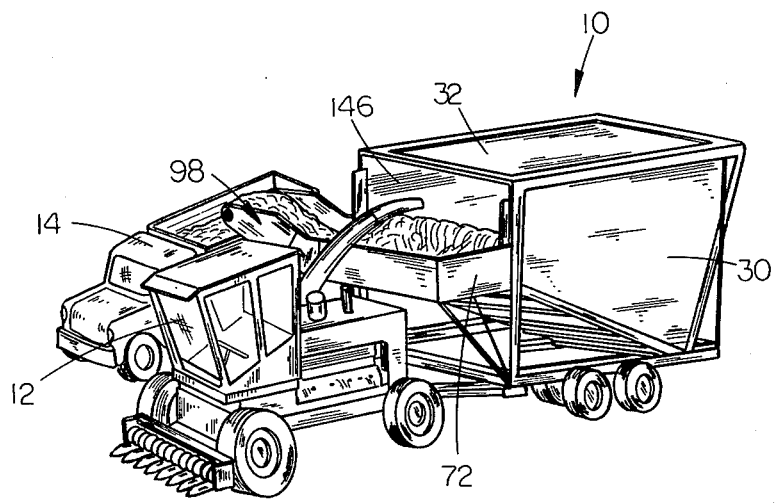
FIG. 2 is a diagrammatic perspective view showing the forage accumulator box towed behind a self-propelled cutter and with a truck positioned next to it for receiving material discharged therefrom.

The forage accumulator box 10 of the present invention is shown in FIG. 2 in towed relation behind a self-propelled cutter 12 and adjacent a truck 14 which is positioned for receiving forage material discharged from the accumulator box 10.

Figure 1:
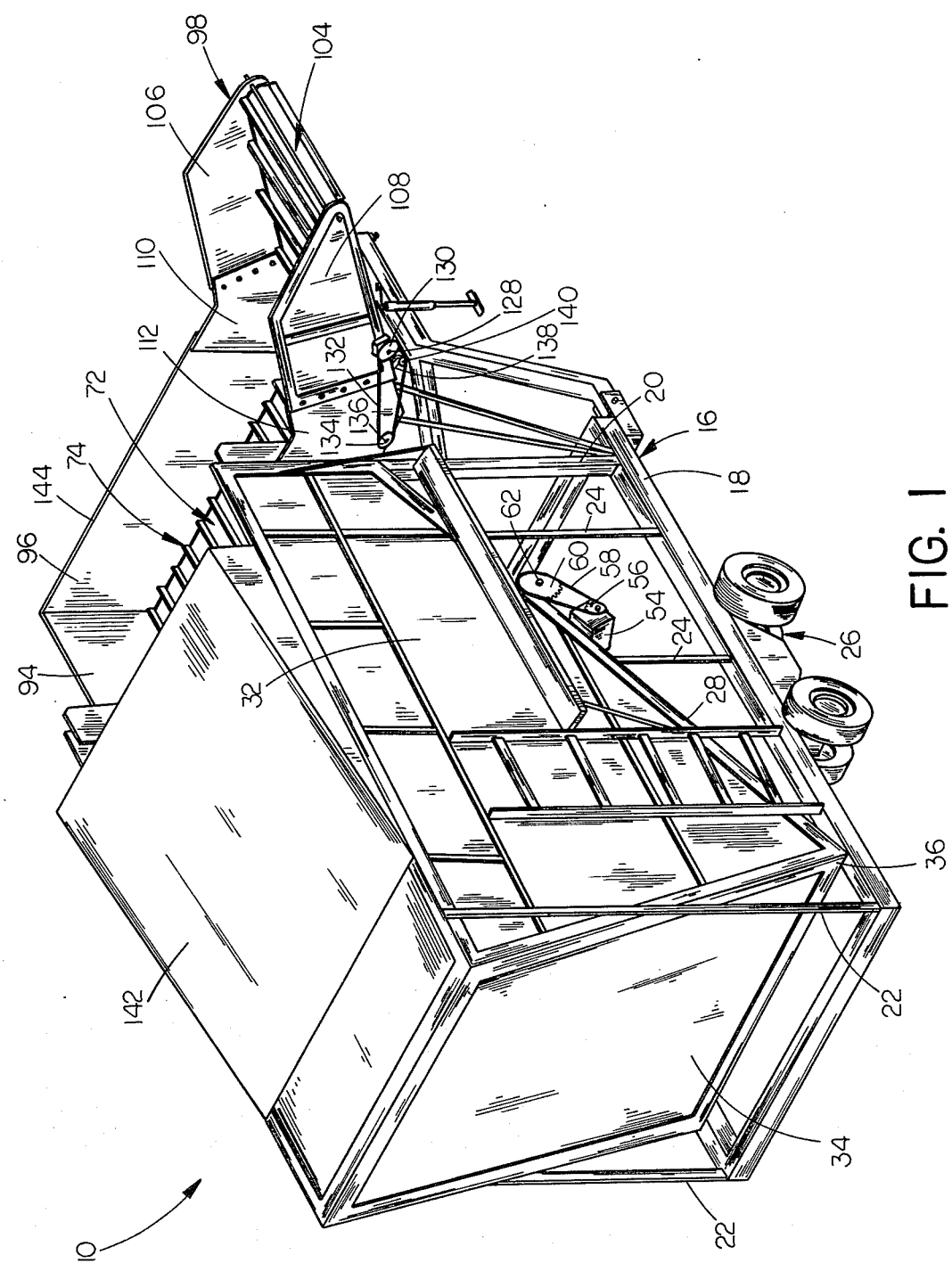
FIG. 1 is a perspective view of the forage accumulator box of the invention.

Referring to FIGS. 1, 4 and 5, accumulator box 10 includes a base frame 16 including generally horizontal peripheral frame tubing 18 with pairs of upstanding forward and rearward posts 20 and 22, respectively, and additional reinforcing posts 24 therebetween. Each side of the frame is supported on a four ground wheel walking beam structure 26.

A longitudinally extended bottom wall 28 is supported on the base frame 16 in forwardly and upwardly inclined relation. A pair of upstanding side walls 30 and 32 and a rearward wall 34 extend upwardly from the opposite sides and rearward end 36 of bottom wall 28 for accumulating and containing forage material supported on the bottom wall.

A main conveyor, indicated generally at 38, is situated on bottom wall 28 for advancing forage material upwardly and forwardly thereon. As shown in FIG. 5, main conveyor 38 is actually a pair of side-by-side slat type chain conveyors. The chains 40 of both conveyors are trained around respective sprockets 42 which are fixed on a shaft 44 which is rotatably supported in suitable bearings at the upper discharge end 46 of bottom wall 28. At the rearward bottom end 48 of bottom wall 28, chains 40 are trained about respective sprockets 50 which are carried on a transverse shaft 52 which may be adjustably supported for maintaining tension in the chains 40.

Power for driving the main conveyor is supplied by a hydraulic motor 54 having a drive sprocket 56 connected by chain 58 to a larger driven sprocket 60 on a shaft 62 which extends transversely across bottom wall 28 to the opposite side thereof. A sprocket 64 on the opposite end of shaft 62 is connected by a chain 66 to a driven sprocket 68 which is fixed on the outer end of upper shaft 52. A chain tightener sprocket 70 engages chain 66 intermediate sprockets 64 and 68.

A platform 72 extends generally horizontally forwardly from a position adjacent and slightly below the upper discharge end 46 of bottom wall 28 for receiving material discharged from the main conveyor onto the platform. A cross conveyor 74 on platform 72 is operative to convey material transversely of the box from starting end 76 to the discharge end 78. Cross conveyor 74 is also a slat type chain conveyor having chains 80 trained about sprockets 82 and 84 on respective shafts at the starting and discharge ends, respectively, of platform 72. A hydraulic motor 86 is operatively connected to the sprockets 82 for driving cross conveyor 74.

Figure 3:
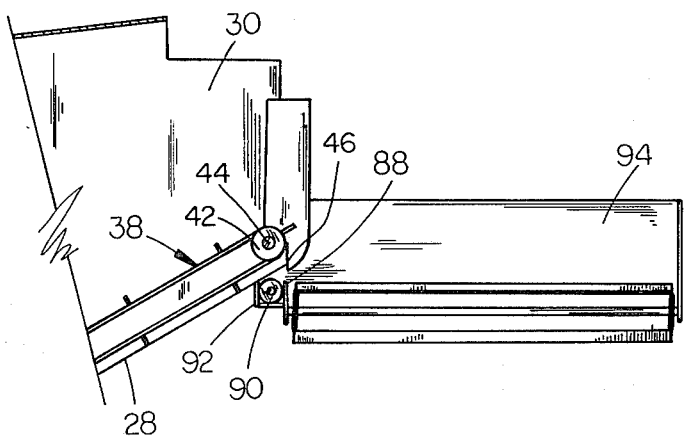
FIG. 3 is an enlarged detail side sectional view taken along line 3—3 in FIG. 5.

FIG. 3 illustrates that the upper discharge end 46 of bottomwall 28 is situated adjacent and above platform 72 for discharging forage material onto it. A vertical cleaning plate 88 extending upwardly along the rearward edge of platform 72 tends to prevent the main conveyor 38 from carrying forage material along back under the bottom wall. In the event that some material may be carried rearwardly over the top of cleaning plate 88, a return auger 90 is rotatably supported within a trough 92 for conveying any such material back to the starting end 76 of cross conveyor 74. Return auger 90 may be driven by an associated hyraulic motor drive system or by any other suitable means.

To contain material on platform 72, a side wall 94 is provided along the starting end 76 thereof and a front wall 96 extends transversely of the accumulator box at the front edge of the platform 72.

A discharge chute 98 is connected to the discharge end 78 of platform 72 for pivotal movement about a longitudinal axis indicated at 100 in FIG. 5. Discharge chute 98 also includes a flat bottom wall 102 having a slat type chain conveyor 104 thereon and upstanding forward and rearward wall members 106 and 108 as shown best in FIG. 1. The forward wall member 106 is situated substantially co-planar with front wall 96 and a flexible wall member 110 of rubber or the like is fastened to and extended between forward wall member 106 and front wall 96 to contain material being conveyed from the cross conveyor 74 to the discharge conveyor 104. Likewise, another flexible wall member 112 connects rearward wall member 108 to the forward edge of upstanding side wall 32.

The flexible wall members 110 and 112 collapse or deform from their planar solid line positions of FIGS. 1 and 5 when the discharge chute 98 is pivoted upwardly about axis 100 to the dotted line transport position shown in FIG. 5. A steel cable 114 is connected at one end to a bracket 116 on the discharge chute, with its other end being secured to the opposite starting end of platform 72 for supporting the discharge chute 98 in its lowered working position. By drawing cable 114 to the right in FIG. 5, the discharge chute is pivotally raised to its dotted line transport position. Movement of steel cable 114 may be controlled by a manual crank and lock mechanism or by a power drive means which may be actuated from the operator's station of the cutter.

Discharge conveyor 104 is driven by a sprocket 118 which is mounted on a transverse shaft 120. A chain 122 is trained about sprocket 118, over a tightener sprocket 124 and around a sprocket 126 on transverse shaft 128. In FIG. 1, it is seen that a sprocket 130 on the other end of shaft 128 is connected by a chain 132 to a sprocket 134 on shaft 136 at the receiving end of discharge conveyor 104. A hydraulic motor 138 includes an output sprocket 140 which drives chain 132 to operate the discharge conveyor 104.

It is furthermore seen in FIG. 1 that a top wall 142 may be connected to and extended between the top edges of upstanding side walls 30 and 32 and rearward wall 34 to further contain forage material in the box. In this regard, it is evident in FIGS. 2 and 5 that the top edge 144 of front wall 96 is situated substantially below the top edges of the upstanding side walls 30 and 32 so that forage material may be directed rearwardly over the front wall 96 and into the relatively large opening 146 for accumulation on bottom wall 28.

A hydraulic flow divider 148 is mounted on the underside of bottom wall 28 as shown in FIG. 4. A pair of hydraulic lines 150 and 152 extend forwardly on the base frame tongue structure 154 for connection to the hydraulic system of a cutter or tractor. Additional pairs of hydraulic conduits 156 connect each hydraulic motor on the box to the flow divider for operation by the hydraulic circuit of the towing vehicle.

Since the cross conveyor 74 is smaller than main conveyor 38, it is preferred to operate the cross conveyor at a velocity approximately three times faster than the main conveyor. The discharge conveyor 104 is likewise operated at a speed similar to that of cross conveyor 74.

Whereas, it is preferred that the discharge chute 98 extend outwardly from the ditch side of the box away from oncoming traffic, it may be situated on the other side of the box and in fact should be so situated for use with a pull type cutter since those implements are generally right-handed.

Thus, there has been shown and described herein a towed forage accumulator box having a main conveyor which operates in a longitudinal direction of travel for discharging material upwardly and forwardly to a discharge conveyor which moves the material perpendicular to the direction of travel for directing the forage material to the elevated discharge chute which is hingedly supported for enabling passage between narrow passes such as bridges and the like. The forage accumulator box of the present invention thus accomplishes at least all of the stated objects.

I claim:

1. A forage accumulator box, comprising, an elongated frame having forward and rearward ends and opposite sides, a tongue structure extended forwardly from said frame for connection to a towing vegicle, ground wheel means on said frame for rolling movement in forward and rearward directions, an elongated upwardly and forwardly inclined bottom wall supported on said frame, said bottom wall having forward and rearward ends and opposite sides, a pair of upstanding side walls and a rear wall extending upwardly from the opposite sides and rearward end of said bottom wall for accumulating forage supported on said bottom wall, a main conveyor on said bottom wall for advancing forage material upwardly and forwardly thereon, a generally horizontal platform at the upper forward end of said bottom wall for receiving material conveyed thereto by said main conveyor, said platform having opposite transversely facing starting and discharge ends, a cross conveyor on said platform for moving material in a direction transversely of said box toward said discharge end, and a discharge chute operatively connected to the discharge end of said platform for pivotal movement about a longitudinal axis for discharging material conveyed thereto by said cross conveyor, said discharge chute being movable between a working position extended transversely upwardly and outwardly from said platform and a transport position having a reduced outward extent from said platfrom whereby the width of said box is reduced upon movement of said discharge chute to the transport position, a forward wall and side wall extending upwardly from the forward side and starting end of said platform for containing forage material on said platform, said discharge chute comprising a stationary discharge platform having a discharge conveyor thereon and forward and rearward wall members, said bottom wall and platform being situated within the transverse extent of said ground wheel means, said forward wall having a top edge situated substantially below the top edges of said upstanding side walls whereby forage material may be directed rearwardly over said forward wall and between said upstanding side walls.

2. The box of claim 1 further comprising a top wall connected to and extending between the top edges of said upstanding side walls.

3. The box of claim 1 wherein said main conveyor and cross conveyor are chain type slat conveyors.

4. The box of claim 1 further comprising a return auger rotatably supported adjacent and below the discharge end of the main conveyor and operative to direct any material delivered thereto toward the starting end of said cross conveyor.

5. The box of claim 1 wherein said forward and rearward wall members each have a flexible wall portion which is bent in response to pivotal movement of said discharge platform from the working position thereof and which is fully extended in said working position to at least partially define said working position.

6. The box of claim 5 wherein said forward wall member further comprises means for connecting the flexible wall portion thereof to said forward wall and said rearward wall member further comprises means for connecting the flexible wall portion thereof to a forward end of one side wall.

* * * * *